Jan. 24, 1967  B. J. LEIGH  3,300,191
CABLE GUIDING DEVICE
Filed April 30, 1965  2 Sheets-Sheet 1
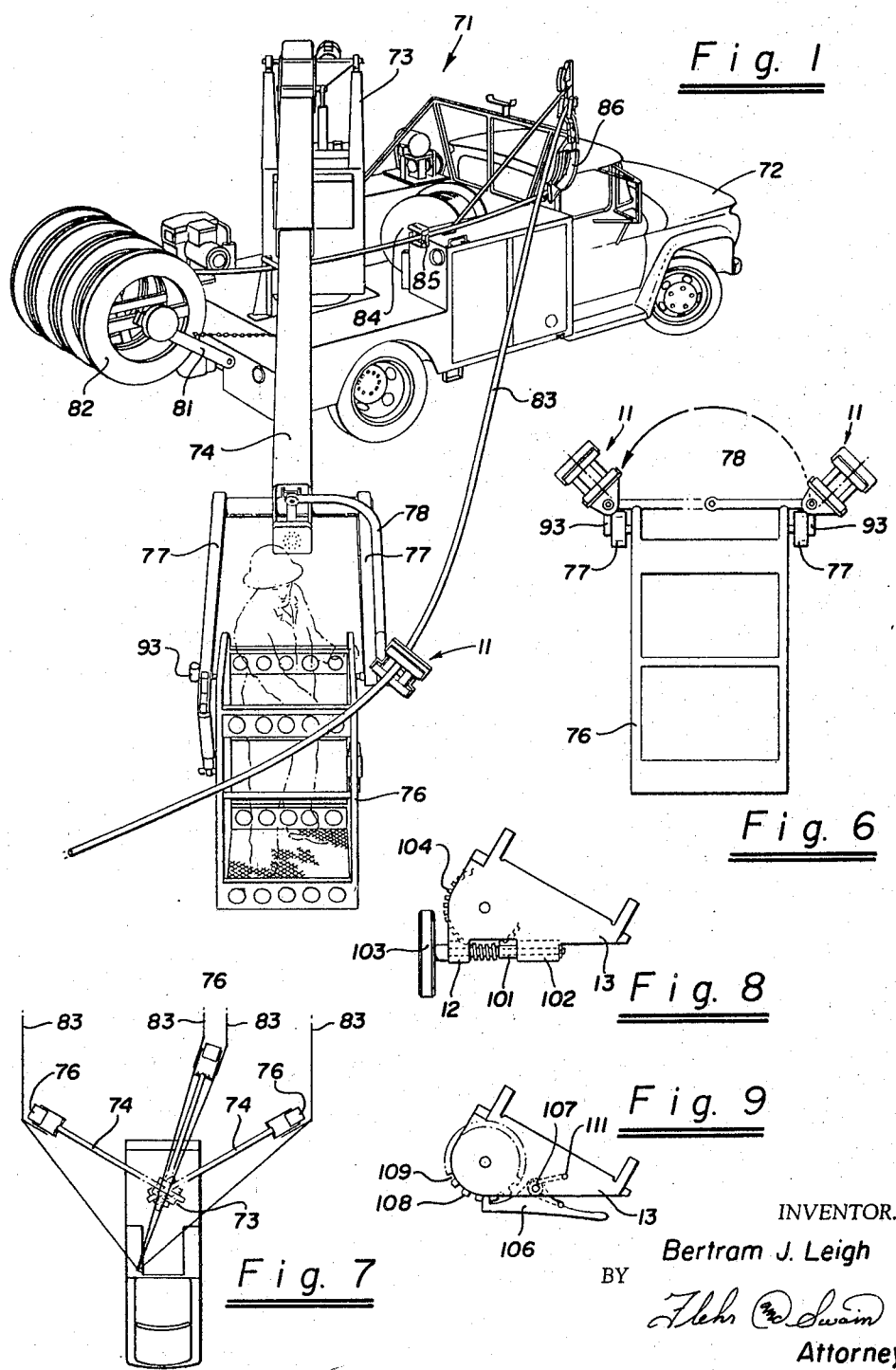
INVENTOR.
Bertram J. Leigh
BY
Attorneys

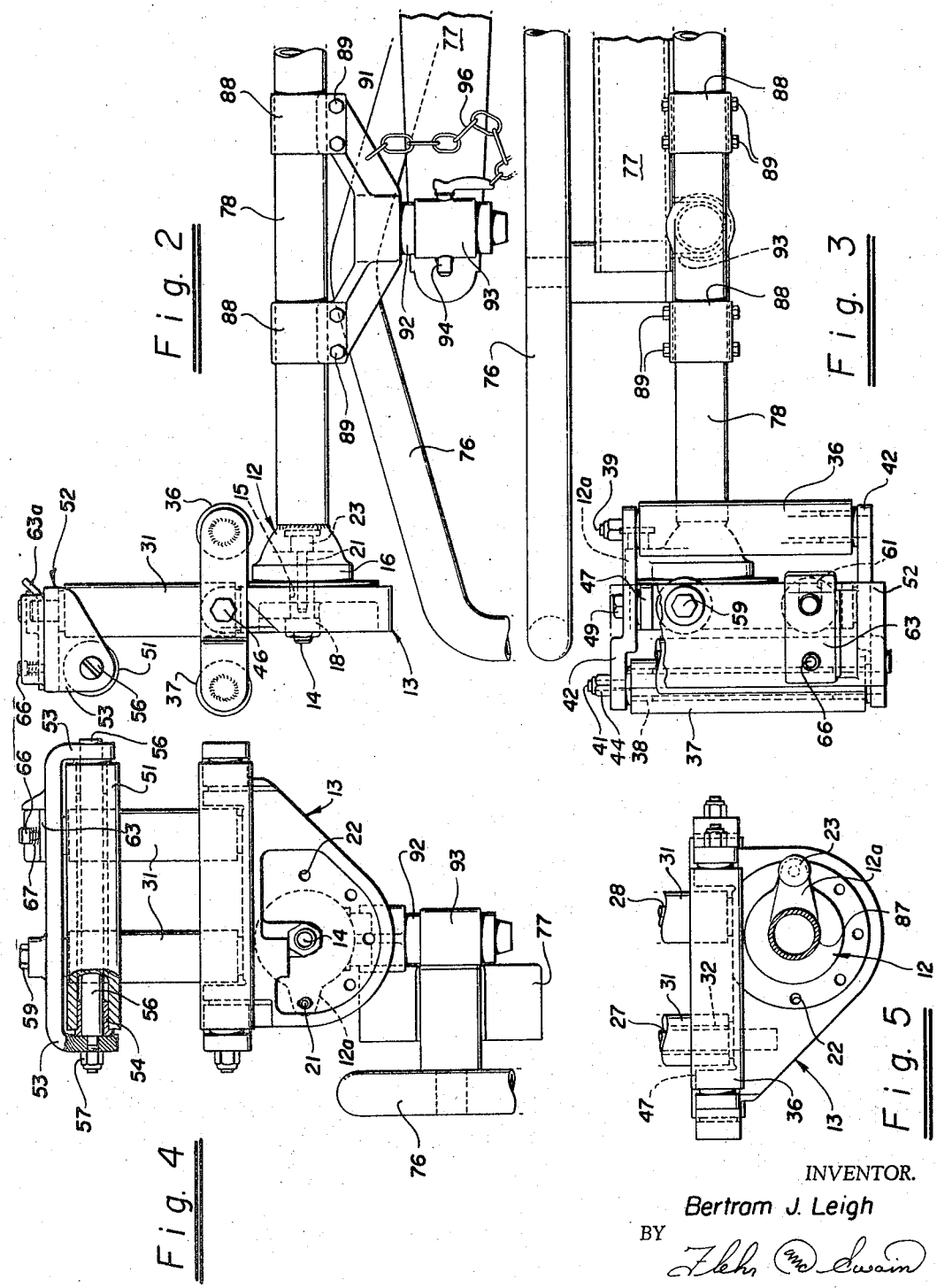

United States Patent Office 3,300,191
Patented Jan. 24, 1967

3,300,191
CABLE GUIDING DEVICE
Bertram J. Leigh, Redwood City, Calif., assignor to Telsta Corporation, San Carlos, Calif., a corporation of California
Filed Apr. 30, 1965, Ser. No. 452,316
13 Claims. (Cl. 254—190)

This invention relates generally to a cable guiding device and more particularly to a cable guiding device for use in the stringing of messenger, telephone cable and the like.

In Patent No. 2,949,279, there is disclosed a cable guiding device. However, it has been found that this cable guiding device has limitations particularly when it is desired to string or place the cable messenger and the like at different angles with respect to the direction that the cable is fed into the cable guiding device. There is, therefore, a need for a new and improved cable guiding device.

In general, it is an object of the present invention to provide a cable guiding device which can be readily positioned in many different angles to accommodate the changes in direction in which the cable, messenger and the like are fed into the cable guiding device and the direction in which the cable is being placed.

Another object of the invention is to provide a cable guiding device of the above character which is provided with means for decreasing the size of the angle through which the cable passes as it is moved through the cable guiding device.

Another object of the invention is to provide a cable guiding device of the above character in which the cable can be readily inserted and removed.

Additional objects and features of the invention will appear from the following description in which the preferred embodiments are set forth in detail in conjunction with the accompanying drawings.

Referring to the drawings:
FIGURE 1 is a perspective view of a cable stringing apparatus using a cable stringing device incorporating the present invention.
FIGURE 2 is an enlarged side elevational view of the cable stringing device shown in FIGURE 1.
FIGURE 3 is a top plan view of the cable stringing device shown in FIGURE 2.
FIGURE 4 is a front elevational view with certain parts broken away of the cable stringing device shown in FIGURE 2.
FIGURE 5 is a rear elevational view of a portion of the cable stringing device shown in FIGURE 2.
FIGURE 6 is a front elevational view illustrating movement of the cable stringing device from one side of the workman's platform or basket to the other.
FIGURE 7 is a top plan view of the cable stringing apparatus shown in FIGURE 1 illustrating various positions of the cable stringing apparatus and the cable stringing device in stringing cable and the like at various angles.
FIGURE 8 is a partial view illustrating an additional embodiment of the cable stringing device incorporating the present invention in which a worm is utilized for adjusting the angle at which the cable guiding device is positioned.
FIGURE 9 is a partial view of another embodiment of the cable stringing device incorporating the present invention showing a pawl and ratchet mechanism for adjusting the angle of the cable guiding device.

In general, the cable guiding device forming the present invention consists of a support member with a pair of spaced substantially parallel rollers rotatably mounted upon the support member. An additional pair of spaced substantially parallel rollers is disposed on opposite sides of the first named rollers and extend between the first named pair of rollers in a direction at substantially right angles to the first named pair of rollers. The first named and additional pairs of rollers have overlapping portions. Means is provided for rotatably mounting the additional pair of rollers on the support member and for pivotal movement about an axis parallel to the axes of rotation of said additional rollers and at substantially right angles to the axes of rotation of the first named pair of rollers. A single additional roller is also provided. Means is provided for mounting this single additional roller on the support member for movement between an open position in which the cable can be inserted between the first named pair of rollers and placed upon the additional pair of rollers and in a closed position in which the single additional roller extends between the first named pair of rollers and in a direction at right angles to the axis of rotation of the first named pair of rollers and spaced from and substantially parallel to the additional pair of rollers. Portions of the single additional roller overlap the first named pair of rollers.

More particularly, as shown in the drawings, the cable guiding device 11 consists of first and second elements in the form of a support body 12 and a support member 13, respectively. Means is provided for interconnecting the first and second elements to permit rotational movement of one element with respect to the other and consists of a threaded stud shaft 14 which is provided on the first support element 12 and which extends through a hole 15 in support element 13. The first support element 12 is also provided with a flange 16 which abuts one side of the second support element 13. A nut 18 is threaded onto the stud shaft 14 and retains the support element 13 on the stud shaft 14. The shaft 14 holds the support element 13 in a plane which is substantially at right angles to the stud shaft 14.

Means is provided for adjusting the relative angular position of one support element with respect to the other and as shown in FIGURES 2, 3 and 4, consists of a spring loaded pin 21 which is slidably mounted in a boss-like portion 12a of the support member 12 and which is adapted to be seated within the plurality of circumferentially spaced holes 22 provided in the support member 13. A knob 23 is provided on the pin 21 to facilitate its removal from and insertion in the holes 22. By removal of the pin 21, it can be seen that the support elements 12 and 13 can be rotated with respect to each other and then after insertion of the pin 21 in one of the holes 22 held in a predetermined fixed angular relationship with respect to each other.

A pair of spaced substantially parallel pins 27 have their lowermost ends mounted in the support element 13. A pair of spaced parallel rollers 31 are rotatably mounted on the pins 27 by suitable means such as by spaced pairs of bushings 32.

A pair of additional rollers 36 and 37 is provided. The rollers 36 and 37 are disposed on opposite sides of the rollers 31 and extend between the rollers 31 in a direction at substantially right angles to the rollers 31. It also will be noted that the additional rollers 36 and 37 have portions which overlap the rollers 31. The rollers 36 and 37 are mounted upon bushings (not shown) which are rotatably mounted upon roller shafts 39 and 41 which are mounted in opposite ends of arms 42. As can be seen, particularly from FIGURE 3, one end of each of the roller shafts 39 and 41 is rigidly secured to the arms 42 by suitable means such as welding. The other end of each of the shafts 39 and 41 is secured to the arms 42 by a nut 44 threaded thereon to retain the roller shafts 39 and 41 in the desired position and to provide a rigid assembly. It will be noted that the roller 36 on the incoming side of the cable guide device is shorter than the roller 37 on the outgoing side. For this reason, the arms 42 are substantially Z-shaped and have portions intermediate the ends thereof which are pivotally mounted upon the second support element 13 by suitable means such as stud shafts 46 affixed to ears 47 provided on the support element 13. Nuts 49 retain the arms 42 on the stud shafts 46. From the arrangement shown, it can be seen that the arms 42 which are mounted for pivotal movement about a horizontal axis which is perpendicular to the axes for the vertical roller shafts 27.

A single additional roller 51 is provided. Means is provided for mounting this single additional roller 51 for movement between an open position in which the cable can be inserted between the vertical rollers 31 and placed upon the rollers 36 and 37 and in a closed position in which the single additional roller 51 extends between the rollers 31 in a direction at right angles to the rotation of the rollers 31 and is spaced from and is substantially parallel to the rollers 36 and 37 and in which portions of the single additional roller overlap portions of the rollers 31. This means consists of a mounting member 52 which is provided with depending ears 53. The additional roller 51 is rotatably mounted upon bushings 54 which are mounted on a roller shaft 56 that is mounted in the depending ears 53 and secured thereto by nut 57.

At one end, the mounting member 52 is pivotally mounted upon the end of one of the roller shafts 27 opposite the end which is secured to the plate 27 and is retained thereon by suitable means such as a cap screw 59. With this pivotal mounting for the mounting member 52, it can be seen that the mounting member with the additional roller 51 mounted thereon can be swung in a horizontal plane generally perpendicular to the vertical rollers 31. Means is provided for securing the free end of the mounting member 52 to the other roller shaft 27. This means consists of a slot 61 (see FIGURE 3) which is provided in the mounting member 52. This slot is adapted to receive the upper end of the other roller shaft 27. Means is provided on the mounting member 52 for retaining the upper end of the other roller shaft 27 in the slot 61 and consists of a latch member 63 which is disposed on top of the member 52. The latch member 63 is loosely mounted for vertical movement upon an Allen head screw threaded into the mounting member 52 and is yieldably urged into a roller shaft engaging position by a spring 67 mounted upon the screw 66. The latch member 63 is provided with a forwardly extending upturned portion 63a which is used for camming the latch member 63 upwardly when the latch member strikes the roller shaft 27 as the mounting member 52 swings to a closed position.

The cable guiding device 11 is shown in use in FIGURE 1 in conjunction with a cable stringing apparatus 71 which consists of a self-propelled vehicle 72 upon which there is mounted a lift supporting structure 73 rotatable about a vertical axis. The lift supporting structure 73 carries an extensible boom structure 74 which can be extended and retracted or moved towards and away from the vehicle and which can be raised and lowered about a horizontal axis with respect to the vehicle. A workman's platform or basket 76 is secured to the outer end of the boom structure by a pair of arms 77. The cable guiding device 11 is mounted on a tubular support member 78 which is substantially L-shaped in form and which has one end pivotally secured to the outer end of the boom structure for swinging movement about an axis parallel to the horizontal axis of the boom structure 74. Thus as shown in FIGURE 2, the support element 12 is welded to the tubular member 78. A hydraulic cable reel support assembly 81 is mounted on the rear of the vehicle and carries cable reels 82 which carry the cable 83 to be placed. Messenger or strand to be placed is carried on a reel 84 mounted upon the vehicle 72. As can be seen from FIGURE 1, the cable passes from the reels through another cable guiding device 85 which can be of the type described in Patent No. 2,949,279 and through a split bullwheel assembly 86 of the type described in Patent No. 3,103,345. Thereafter it passes through the cable guiding device 11.

Suitable means is provided for rigidly securing the outer end of the support member 78 to retain it in a desired position and consists of a pair of clamps 88 which are secured by bolts 89 to a Y-shaped saddle 91. The saddle 91 is provided with a large pin 92 which is adapted to be slidably and removably mounted in a cylindrical fitting 93 secured to each of the support arms 77. The pin 92 is retained within the selected cylindrical sleeve 93 by a retaining pin 94 which extends through holes (not shown) in the sleeve 93 and in the pin 92. A chain 96 is provided for securing the retaining pin 94 to the saddle 91 so that it will not be lost when it is removed from the sleeve 93.

Operation and use of the cable guiding device in connection with the cable placing apparatus as shown in FIGURE 1 may now be briefly described as follows.

When it is desired to string cable, the cable 83 is taken from the reel as shown in FIGURE 4, placed through the cable guiding device 84, through the bullwheel assembly 86 and through the cable guiding device 11 at the workman's basket. If the free end of the cable is not available, this can be readily accomplished by raising the latch member 63 to clear the upper end of the shaft 27 to permit the mounting member 52 to be swung to an open position and to permit the cable to be placed between the vertical rollers 31 upon the rollers 36 and 37. Thereafter the mounting member 52 may be swung towards the closed position and the latch will be automatically cammed upwardly by the upper end of the roller shaft 27 and then will be forced to drop down upon the upper end of the roller shaft 27 by the spring 67 to thereby latch the mounting member 52 in the closed position.

After the cable 83 has been properly tied off, the vehicle 72 can be advanced and the boom 74 positioned to cause the cable to be placed in the desired position. In the placing of cable, the cable guiding device can be placed in any number of desired positions in order to obtain the most advantageous placement of the cable without placing undue stress or bending upon the cable or cable placing apparatus. This is true because the support arm 78 can be swung to either side of the basket as shown particularly in FIGURE 6 and the saddle 91 secured in sleeve 93 secured to the arm 77 on that side. This will permit placement of cable from either side of the vehicle. In addition, the positioning of the cable guiding device 11 makes it possible to place cable at all different angles of the boom structure as shown in FIGURE 7. This is made possible by making the proper angular adjustment between the first and second support elements 12 and 13 by removal of the pin 21 and adjusting the second mounting element with respect to the first mounting element to the desired angular position and then inserting the pin 21 into the desired hole 22 in the first support element 13. By providing additional holes for the pin 21 first mounting member 12 it is possible to obtain practically any desired angle. Thus, it is possible to position the cable guiding device 11 in such a manner that the rollers 36 and 37 are at right angles to the direction of movement of the cable 83. This also makes it possible for the rollers 36 and 37 to carry substantially all of the force applied to the cable guiding device by the cable 83.

The use of the cable guiding device 11 is also advantageous because the rollers 36 and 37 are mounted upon the rocker arms 42 which permit the cable to be placed at a relatively sharp angle with respect to the cable guiding device. This is true because the rollers 36 and 37 serve to divide the angle through which the cable normally would have to pass without such means into two separate angles each of which is one-half of the total angle. Thus, it is possible for the cable to pass through a much smoother wide curve, as shown in FIGURE 1, rather than through a sharp bend. The rollers 36 and 37 will follow the cable and always serve to divide the angle through which the cable passes.

It should, however, be noted that although the cable guiding device 11 is designed to take the principal load on rollers 36 and 37, that loading can also be accommodated by the rollers 31 and 51 so that the cable always will be in engagement with at least one roller without any danger of jamming in the cable guiding device or injuring the cable. This is true because the rollers all have overlapping portions which prevent such an occurrence. Top loading is also permitted because the top member 51 is of very rigid construction.

When it is desired to shift the cable guiding device to the other side of the workman's basket, it is merely necessary to raise the tubular support member 78 and to move the same to the other side of the basket after which the angular position of the second support element 13 with respect to the first support element 12 can be readily adjusted.

Additional embodiments of the invention are shown in FIGURES 8 and 9 and particularly illustrate different means for shifting the angular position of the second element with respect to the first support element. Thus, in FIGURE 8 there is shown a worm 101 which is rotatably mounted in ears 102 carried by the second support element 13. A hand wheel 103 is provided for operating the worm 101. The worm engages a worm gear 104 which is secured to the first support element 12. It can be readily seen that by rotation of the hand wheel 103, the angular position of the second support element 13 relative to the first support element 12 can be readily adjusted.

Similarly, as shown in FIGURE 9, a pawl 106 is pivotally mounted on the support element 13 by a pin 107. A ratchet 108 is mounted upon the first support element 12 and is provided with a plurality of recesses 109 which are adapted to be engaged by the pawl 106. A spring 111 which has one end secured to the support member 13 and the other end engaging the pawl 96 is provided for yieldably urging the pawl into engagement with the ratchet 108. Again, it can be seen that the angular position of the first and second support elements 12 and 13 can be readily adjusted to the desired angular position.

It is apparent from the foregoing that there has been provided a new and improved cable guiding device which is particularly useful in the placement of cable messenger strand and the like. In addition, the cable strand messenger can be placed at many different angles from the cable placing apparatus without endangering the cable. In addition, the angle of the cable guiding device can be readily adjusted.

I claim:

1. In a cable guiding device, a support element, a pair of spaced substantially parallel rollers rotatably mounted on said support element, an additional pair of spaced substantially parallel rollers disposed on opposite sides of said first named rollers and extending between said first named pair of rollers adjacent one end thereof in a direction at substantially right angles to said first named pairs of rollers, said first named and additional pairs of rollers having overlapping portions, means rotatably mounting said additional pair of rollers on said support element and for free pivotal movement on said support element about an axis parallel to the axis of rotation of said additional rollers and at substantially right angles to the axis of rotation of the first named pair of rollers, a single additional roller, and means mounting said single additional roller on said support element for movement between an open position in which the cable can be inserted between the first named pair of rollers and placed upon the additional pair of rollers and a closed position in which said single additional roller extends between the first named pair of rollers adjacent the other end thereof and in a direction at right angles to the axis of rotation of the first named pair of rollers and being spaced from and substantially parallel to the additional pair of rollers, portions of said single additional roller overlapping the first named pair of rollers.

2. A device as in claim 1 together with an additional support element and means pivotally mounting said first named support element on said additional support element, and means connected to said first named and additional support elements for adjusting the relative angular positions of the first named and additional support elements with respect to each other.

3. A device as in claim 2 wherein said means for adjusting the angular position includes a pin slidably mounted in one of the elements and in which the other element is provided with holes adapted to receive the pin.

4. A device as in claim 2 wherein the adjusting means includes a worm gear and a worm.

5. A device as in claim 2 wherein the adjusting means includes a ratchet and a pawl.

6. In a cable guiding device, first and second support elements, means for rotatably mounting one of the support elements on the other, means for adjusting the angular position of the first and second support elements with respect to each other, a pair of spaced substantially parallel rollers rotatably mounted on said second support element, an additional pair of spaced substantially parallel rollers disposed on opposite sides of the first named rollers adjacent the other end thereof and extending between said first named pair of rollers in a direction substantially at right angles to said first named pair of rollers, said first named and additional pairs of rollers having overlapping portions, means for rotatably mounting said additional pair of rollers on said second support element for free pivotal movement on said support element about an axis parallel to the axis of rotation of the additional rollers and substantially at right angles to the axis of rotation of the first named pair of rollers, a single additional roller, and means of mounting said single additional roller on said second support element so that said single additional roller extends between said first named pair of rollers adjacent the other end thereof and in a direction at right angles to the axis of rotation of the first named pair of rollers and being spaced from and substantially parallel to the additional pair of rollers.

7. A cable guiding device as in claim 6 wherein the means for adjusting the angular position of the first and second support elements includes a pin slidably mounted in one of said elements and wherein the other of said elements is provided with a plurality of circumferentially arranged holes which are adapted to receive the pin to retain the elements in a desired angular relationship with respect to each other.

8. A cable guiding device as in claim 6 wherein said means for mounting said additional pair of rollers on said second support element includes a pair of arms having portions intermediate the ends thereof pivotally mounted on said second support element, and means mounting said additional pair of rollers on the ends of said arms.

9. A cable guiding device as in claim 8 wherein one of said rollers of said additional pair of rollers has a length which is substantially greater than the length of the other roller of the additional pair of rollers.

10. In a cable guiding device, first and second support elements, means for rotatably mounting one of the support elements on the other, means for adjusting the angular position of the first and second support elements with respect to each other, a pair of spaced substantially parallel cable guiding elements mounted on said second support element, an additional pair of spaced substantially parallel cable guiding elements disposed on opposite sides of the first named cable guiding elements and extending between said first named cable guiding elements in a direction substantially at right angles to said first named cable guiding elements, and means for mounting said additional cable guiding elements on said second support element for free pivotal movement on said support element about an axis parallel to the axes of said additional pair of cable guiding elements.

11. A cable guiding device as in claim 10 wherein said means mounting said additional pair of cable guiding elements includes a pair of arms having portions intermediate the ends thereof pivotally mounted on said second support element and wherein said additional cable guiding elements are mounted on the ends of said arms.

12. A cable guiding device as in claim 1 adapted to be used with a boom structure together with a support arm adapted to be secured to the boom structure and wherein said support element is secured to the support arm.

13. In a cable guiding device, a boom structure, a support arm, means for pivotally mounting said support arm on said boom structure and including means for removably securing the support arm in a predetermined pivoted position with respect to the boom structure, a support element secured to the support arm, a pair of spaced substantially parallel rollers rotatably mounted on said support element, an additional pair of spaced substantially parallel rollers disposed on opposite sides of said first named rollers and extending between said first named pair of rollers in a direction at substantially right angles to said first named pair of rollers, said first named and additional pairs of rollers having overlapping portions, means rotatably mounting said additional pair of rollers on said support element and for pivotal movement on said support element about an axis parallel to the axis of rotation of said additional rollers and at substantially right angles to the axis of rotation of the first named pair of rollers, a single additional roller, means mounting said single additional roller on said support element for movement between an open position in which the cable can be inserted between the first named pair of rollers and placed upon the additional pair of rollers and a closed position in which said single additional roller extends between the first named pair of rollers adjacent to the other end thereof and in a direction at right angles to the axis of rotation of the first named pair of rollers and being spaced from and substantially parallel to the additional pair of rollers, portions of said single additional roller overapping the first named pair of rollers.

References Cited by the Examiner
UNITED STATES PATENTS

| | | | |
|---|---|---|---|
| 307,986 | 11/1884 | Porritt | 254—190 X |
| 695,381 | 3/1902 | Dutton | 254—190 |
| 797,904 | 8/1905 | Meyer | 254—190 X |
| 843,214 | 2/1907 | Juve. | |
| 1,767,735 | 6/1930 | Brown | 254—190 X |
| 2,289,428 | 7/1942 | Hunt | 254—190 |
| 2,738,143 | 3/1956 | Hannay. | |
| 2,783,025 | 2/1957 | Scheidt | 254—190 |
| 2,808,716 | 10/1957 | Brunnen. | |
| 2,949,279 | 8/1960 | Eitel | 254—190 |

SAMUEL F. COLEMAN, *Primary Examiner.*